United States Patent [19]
Gotoh et al.

[11] Patent Number: 5,854,537
[45] Date of Patent: Dec. 29, 1998

[54] HEAD LAMP DEVICE FOR VEHICLE INCLUDING LIGHT DISTRIBUTION CONTROL OF AN AUXILIARY LIGHT SOURCE

[75] Inventors: Shinichiro Gotoh; Takeshi Kobayashi; Shujiro Ohnuma; Tatsuya Ishizaki, all of Wako, Japan

[73] Assignee: Honda Giken Kogyo Kabushiki Kaisha, Tokyo, Japan

[21] Appl. No.: 690,892

[22] Filed: Aug. 1, 1996

[30] Foreign Application Priority Data

Aug. 4, 1995 [JP] Japan .................................. 7218280

[51] Int. Cl.⁶ .................................................. H05B 37/02
[52] U.S. Cl. ............................. 315/82; 315/81; 307/10.8
[58] Field of Search ............................. 315/82, 76, 81, 315/79; 307/9.1, 10.1, 10.8; 362/64, 65, 66, 71

[56] References Cited

U.S. PATENT DOCUMENTS

| | | | |
|---|---|---|---|
| 1,954,075 | 4/1934 | Falge et al. | 315/10.8 |
| 1,954,806 | 4/1934 | Falge et al. | 315/10.8 |
| 4,891,559 | 1/1990 | Matsumoto et al. | 315/82 |

FOREIGN PATENT DOCUMENTS 6171420  6/1994  Japan .

*Primary Examiner*—Don Wong
*Assistant Examiner*—David H. Vu
*Attorney, Agent, or Firm*—Carrier, Blackman & Associates, P.C.; Joseph P. Carrier; William D. Blackman

[57] ABSTRACT

A head lamp device for a vehicle by which a pedestrian on the opposing vehicle lane side can be easily perceived without giving glare on an opposing vehicle. The head lamp device comprises main light emitting mechanism capable of changing over a low beam and a high beam from each other; an auxiliary light emitting mechanism for lighting a front and upper portion on the opposing vehicle lane side; an opposing vehicle sensor for detecting existence of an opposing vehicle; and a control mechanism for controlling the auxiliary light emitting mechanism. The control mechanism decreases or turns off the light of the auxiliary light emitting mechanism in response to input of an opposing vehicle detection signal from the opposing vehicle sensor when the main light emitting mechanism emits the low beam and at the same time the auxiliary light emitting mechanism is turned on.

13 Claims, 7 Drawing Sheets

HEAD LAMP DEVICE FOR VEHICLE INCLUDING LIGHT DISTRIBUTION CONTROL OF AN AUXILIARY LIGHT SOURCE

BACKGROUND OF THE INVENTION

This invention relates to a head lamp device for a vehicle, and more particularly, light distribution control by an auxiliary light emitting means.

The head lamp device for a vehicle is operated such that a high beam having a sufficient long distance lighting ability capable of confirming an obstacle placed in front at a far distance at night and a low beam directed downward so as not to give any glare on an opposing vehicle when a subject vehicle passes by the opposing vehicle are changed over from each other.

Since the low beam is formed so that especially the light distribution on the side of the opposing vehicle lane is directed downward to give no glare on the opposing vehicle, there is a problem that it is difficult to detect a pedestrian at a long distance as well as at a short distance on the opposing vehicle lane side under the low beam.

From a viewpoint of facilitating a driver's visible detection of the walker, there has been known a head lamp device of Japanese Patent Laid-open Publication No. Hei 6-171420. However, the head lamp device aims to obtain a good visual confirmation using flicker phenomenon and the object to be found is a pedestrian within an ordinary lighting region and not always a pedestrian on the opposing vehicle lane side.

SUMMARY OF THE INVENTION

The present invention has been invented in view of the foregoing and it is an object of the present invention to provide a head lamp device for a vehicle enabling a driver to easily, visibly detect a pedestrian on the opposing vehicle lane side without giving glare on the opposing vehicle.

In order to accomplish the aforesaid object, the present invention provides a head lamp device for a vehicle comprising main light emitting means capable of changing over a low beam and a high beam from each other; auxiliary light omitting means for lighting a front and upper portion on an opposing vehicle lane side; opposing vehicle detection means for detecting existence of the opposing vehicle; and control means for controlling the auxiliary light emitting means which decreases or turns off the light of the auxiliary light emitting means in response to input of an opposing vehicle detection signal from the opposing vehicle detection means when the main light emitting means emits the low beam and at the same time the auxiliary light emitting means is turned on.

Since the auxiliary light emitting means lights a front and upper portion on an opposing vehicle lane side, a pedestrian on the opposing vehicle lane side can be easily detected when the auxiliary light emitting means is turned on.

However, when the opposing vehicle comes near, if the auxiliary light emitting means is turned on, the opposing vehicle is given glare. Therefore, when the opposing vehicle detection means detects an opposing vehicle, the control means decreases or turns off the light of the auxiliary light emitting means so as not to give the opposing vehicle glare.

An auxiliary light emitting selection switch to be manipulated by the driver for selecting whether turning on of the auxiliary light emitting means is appropriate or not may be provided. In this case, the above-mentioned control means prohibits the turning on of the auxiliary light emitting means when the main light emitting means emits the low beam and the auxiliary light emitting selection switch is turned off. According to this configuration, by manipulating the auxiliary light emitting selection means, the driver can prohibit the turning on of the auxiliary light emitting means when he perceives that the turning on of the auxiliary light emitting mean is unnecessary, and the auxiliary light emitting means can be turned on only when necessary, to avoid useless consumption of electric power.

A vehicle speed sensor may be provided so that the above-mentioned control means prohibits the turning on of the auxiliary light emitting means when the main light emitting means emits the low beam and the vehicle speed sensor detects a slow speed below a specific speed. Since under slow running at the low speed the turning on of the auxiliary light emitting means is unnecessary and merely gives glare to the opposing vehicle, the turning on of the auxiliary light emitting means at such a low speed is prohibited.

The above-mentioned control means may prohibit the turning on of the auxiliary light emitting means when the main light emitting means emits the low beam and a turn indicator switch is manipulated on. Since the auxiliary light emitting means does not always light a pedestrian when the vehicle changes its running direction, the turning on of the auxiliary light emitting means is prohibited to reduce glare given to the opposing vehicle as possible when the turn indicator switch is manipulated on.

The above-mentioned control means may prohibit the turning on of the auxiliary light emitting means when the main light emitting means emits the low beam, the turn indicator switch is manipulated on and a steering angle sensor detects a steering angle larger than a specific angle. In this configuration, even if the turn indicator switch is manipulated on, the auxiliary light emitting means is not turned off until the specific steering angle is reached, that is, it is not turned off on mere change of lane for example. The turning on of the auxiliary light emitting means can be prohibited only when the steering angle becomes larger than the specific angle to change the running direction and the turning off of the auxiliary light emitting means is necessary.

The above-mentioned opposing vehicle detection means may detect the opposing vehicle by detecting an emitted light from a head lamp of the opposing vehicle. In this configuration, it is possible to detect the opposing vehicle surely for controlling the turning on of the auxiliary light emitting means.

DETAILED DESCRIPTION OF THE PREFERRED EMBODIMENTS

Hereinafter one preferred embodiment of the present invention will be described with reference to FIGS. 1 to 6.

Figure 1:
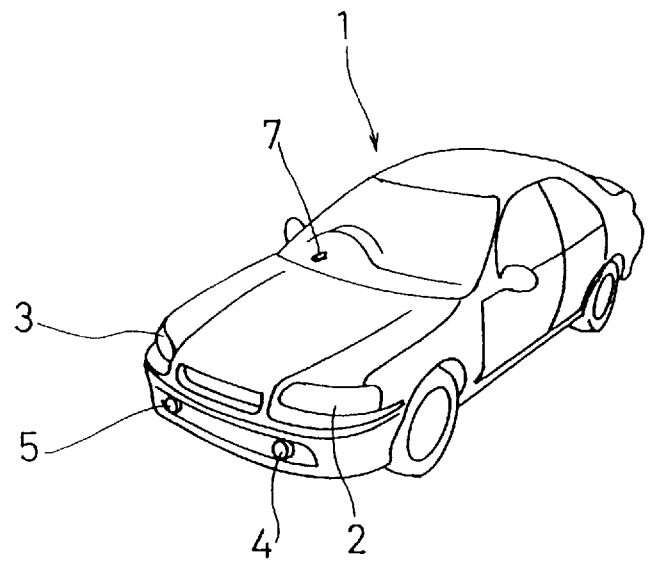
FIG. 1 is a perspective view of a motorcar according to one preferred embodiment of the present invention.

FIG. 1 is a perspective view of a motorcar 1 according to the first preferred embodiment. Each of right and left head lights 3, 2 adopts a double filament bulb capable of changing over a high beam and a low beam from each other. Under the right and left head lights 3, 2 are provided auxiliary lamps 5, 4 respectively. Lighting regions of the left auxiliary lamp 4 and the right auxiliary lamp 5 are different from each other.

Figure 2:
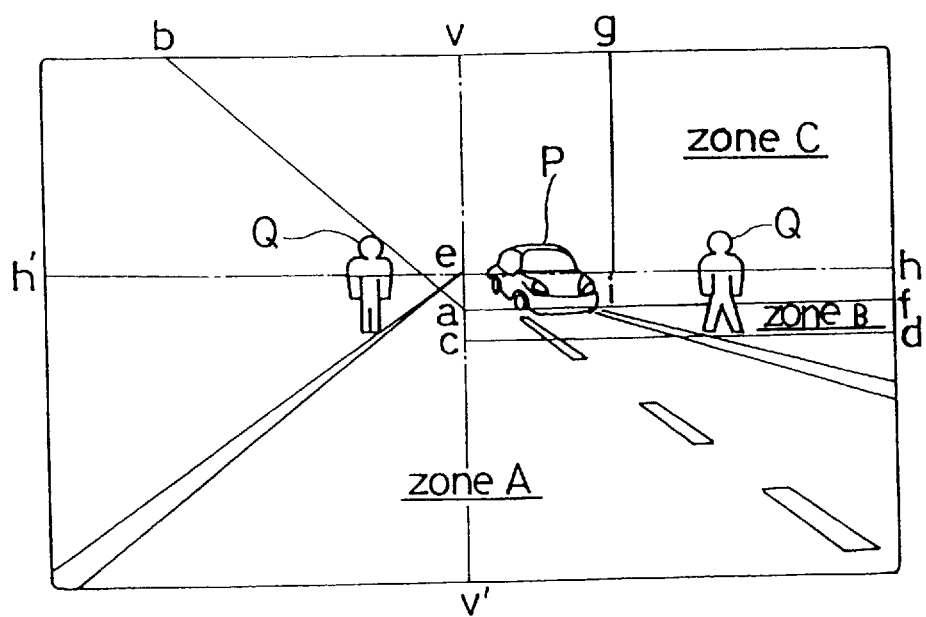
FIG. 2 is an illustrative view showing a light distribution pattern by the head lamp in front of the vehicle as viewed with the driver's eye.

FIG. 2 is an illustrative view showing a light distribution pattern by the head lamp in front of the motorcar as viewed with the driver's eye. The subject vehicle (the above motorcar) is running on the left side lane.

In FIG. 2, e designates a middle point of a line of sight of the driver looking directly forward. Supposing a horizontal line h-h' and a vertical line v-v' passing through the point e, an opposing vehicle P in front, which is particularly required to be confirmed visually, is positioned on a right side horizontal line e-h near the point e and a pedestrian Q on the sidewalk of the opposing vehicle side, which is also particularly required to be confirmed visually, is also positioned on the horizontal line e-h further to the right side of the opposing vehicle P.

The lighting region of the low beam radiated by the head lamps 2, 3 comprises a portion on the left side of the vertical line v-v' and under an oblique line a-b extending obliquely upward from a point a positioned below the point e, and a portion on the right side of the vertical line v-v' and under a horizontal line c-d. The lighting region is shown as zone A in FIG. 2. A pedestrian Q on the left side is positioned under the oblique line a-b namely in the lighting region of zone A. The opposing vehicle P is positioned above the horizontal line c-d and out of the lighting region of zone A so that no glare is given to the opposing vehicle.

The lighting region by the right side auxiliary lamp 5 is a flat rectangular zone B between the horizontal line c-d and a horizontal line a-f positioned somewhat above the line c-d. The zone B is a range wherein feet of the right side pedestrian can be lighted and no glare is given on the opposing vehicle.

The lighting region of the left side auxiliary lamp 4 is a rectangular zone C at a front upper portion on the opposing vehicle lane side, above the horizontal line e-h and on the right side of a vertical line g-i.

In the zone C, the upper half of the pedestrian of the opposing vehicle lane side can be lighted for easy visual confirmation of the pedestrian, however glare is given on the opposing vehicle when it comes near.

In the zone B, since feet of the right side pedestrian are lighted, it is possible to know movement of the pedestrian.

The lighting region of the high beam by the head lights 2, 3, though it is not illustrated, is about a region including the zone A, the zone B and a lower part of the zone C.

Figure 3:
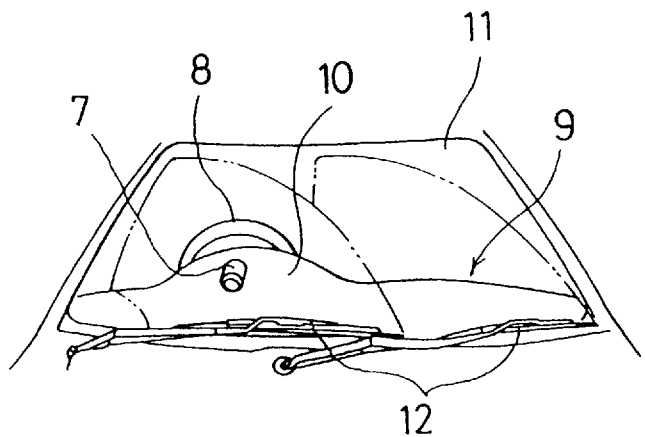
FIG. 3 is a front view of an essential part of the motorcar.

The motorcar 1 has an opposing vehicle sensor 7 which is a photo sensor and equipped on a meter visor 10 of an instrument panel 9 in front of a steering wheel 8 as shown in FIG. 3.

At that position of the opposing vehicle sensor 7, a low beam by a head light of the opposing vehicle can be received easily and the front window glass 11 in front is cleaned by the wiper 12 so that the position in the passenger compartment is always maintained at a state capable of receiving the light well.

Figure 4:
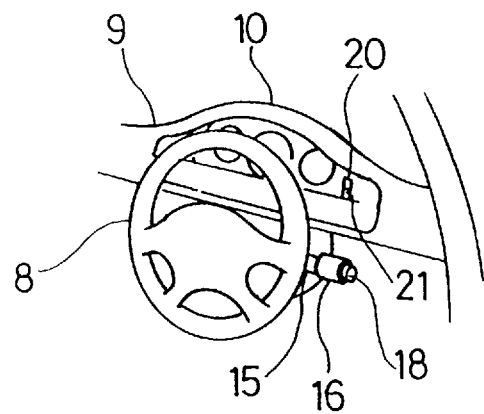
FIG. 4 is a perspective view of a front portion in front of the driver's seat.

An auxiliary light emitting selection switch 18 for selecting whether particularly the left side auxiliary lamp 4 is to be turned on or not, namely the zone C is to be lighted or not, is preferably provided at a tip end of a lighting and turn indicator lever 15 as a push button, as shown in FIG. 4. If the push button is pushed, the switch is held in "on" to allow the auxiliary lighting and if the push button is pushed again the switch is returned in "off" to prohibit the auxiliary lighting.

The auxiliary light emitting selection switch 18, a lighting on-off switch 16 rotatably provided at the tip end portion of the lighting and turn indicator lever 15 and a beam changing over switch 17 (See FIG. 3) which is operated according to forward and rearward swinging motion of the lever 15 itself to change over the high beam and the low beam are all arranged on the lever 15 for convenient use. Namely, all of the switches relating to lamps are arranged intensively so that erroneous manipulations are prevented and manipulations are easy because it is possible to manipulate the switches while gripping the steering wheel 8.

When the lighting and turn indicator lever 15 is swung in the up and down direction, a turn indicator switch 19 (See FIG. 5) is turned on.

On the instrument panel 9, a high beam display lamp 20 and a zone C lighting display lamp 21 are arranged.

Figure 5:
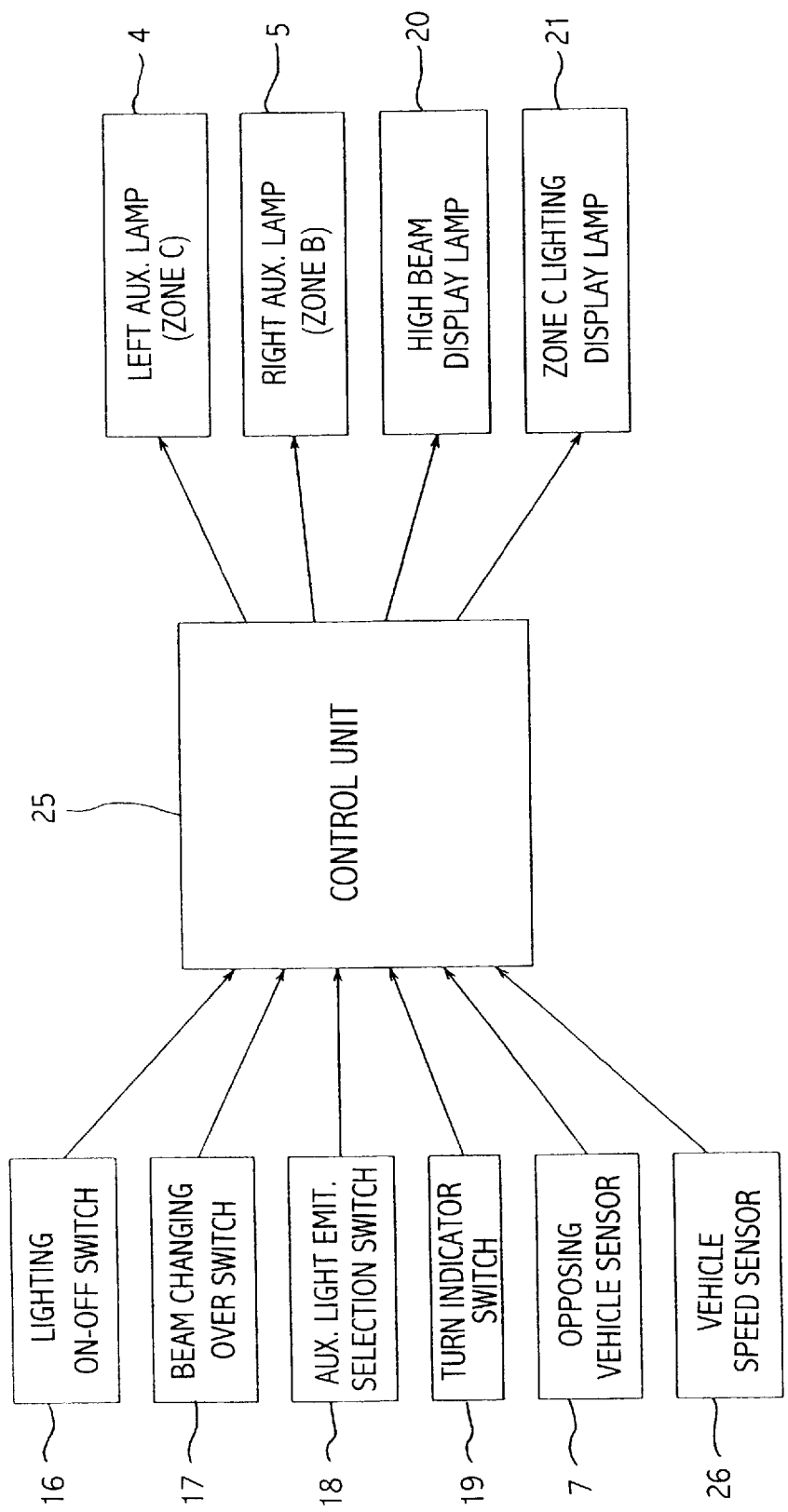
FIG. 5 is a schematic block diagram of a control system in the preferred embodiment.

FIG. 5 shows a schematic block diagram of a control system for drive control of the auxiliary lamps 4, 5.

A computer control is carried out by this control system. A central control unit 25 is inputted with signals from the lighting on-off switch 16, the beam changing over switch 17, the auxiliary light emitting selection switch 18, the turn indicator switch 19, the opposing vehicle sensor 7 and the vehicle speed sensor 26, and treats these signals to output drive instruction signals to the left and right auxiliary lamps 5, 4 and to control turning on of the high beam display lamp 20 and the zone C lighting display lamp 21.

A control procedure in the control system will be described based on the flow chart of FIG. 6.

At first, whether the vehicle's high beam is turned on or not is discriminated at Step 1. When it is not in the high beam turned on state, the flow advances to Step 2 and whether the vehicle's low beam is turned on or not is discriminated. When the low beam is also not turned on, for example, only small lamps are turned on or the vehicle is in a lighting off state, the flow advances to Step 3 where the right side auxiliary lamp 5 is turned off if it has been turned on. Then, at Step 4, the left side auxiliary lamp 4 is turned off if it has been turned on, to stop lighting of the zone C, thereafter the flow returns to Step 1.

When it is discriminated that the vehicle is in the low beam burned on state at Step 2, the flow advances to Step 5 to turn on the right side auxiliary lamp 5 for lighting the zone B.

At step 6, whether the vehicle speed detected by the vehicle speed sensor 26 is lower than a specific speed (for example 10 km/h) or not is discriminated and when the vehicle speed is lower, the flow jumps to Step 4 to turn off the left side auxiliary lamp 4 to stop lighting of the zone C if the lamp 4 has been turned on. When the vehicle speed is not lower, the flow advances to Step 7 and whether the turn indicator switch 19 is turned on or not is discriminated. If the turn indicator switch 19 is turned on, supposing that the vehicle is going to go round a crossing or the like, the flow jumps to step 4 to turn off the left side auxiliary lamp 4 and stop lighting of zone C. If the turn indicator switch 19 is not turned on at Step 7, the flow advances to Step 8.

At Step 8, whether or not the opposing vehicle sensor 7 has detected an opposing vehicle is discriminated. When it is discriminated that the sensor 7 has detected the opposing vehicle, the flow jumps to step 4 where the left side auxiliary lamp 4 is turned off if it has been turned on, to stop lighting of the zone C so as not to give glare on the opposing vehicle.

When no opposing vehicle is detected at Step 8, the flow advances to Step 9 and whether the auxiliary light emitting selection switch 18 is turned on or off is discriminated. If the auxiliary light emitting selection switch 18 is turned off, the flow jumps to Step 4 and turning on of the left side lamp 4 is prohibited. Namely, when the pedestrian can be confirmed visually well to the extent that the driver does not need to light the zone C, the driver can prohibit lighting of the zone C to avoid useless consumption of electric power by turning off the auxiliary light emitting selection switch 18.

If the auxiliary light emitting selection switch 18 is turned on at Step 9, the flow advances to Step 10 to turn on the left side auxiliary lamp 4 and light the zone C. At the next step 11, the zone C lighting display lamp 21 is turned on to let the driver know that the zone C is lighted.

Namely, when the low beam is turned on and conditions that the right side auxiliary lamp 5 is turned on to light the zone B (Step 5), the vehicle speed is not low (Step 6), the turn indicator switch 19 is not turned on (Step 7), there is no opposing vehicle (Step 8) and the auxiliary light emitting selection switch 18 is turned on, are satisfied, the left side auxiliary lamp 4 is turned on to light the zone C (Step 10) so that the pedestrian on the opposing vehicle lane side can be visually confirmed well.

Since at the same time that the upper half body of the pedestrian is lighted by lighting the zone C, feet of the pedestrian are lighted by lighting the zone B, the driver can catch movement of the pedestrian at the same time as finding the pedestrian and if an opposing vehicle is detected (Step 8), lighting of the zone C is stopped so as not to give glare on the opposing vehicle.

Otherwise, when the vehicle speed is low or the vehicle turns to the right or left, unnecessary lighting of the zone C is stopped (Step 4) so as not to trouble the other vehicle and the pedestrian.

When the pedestrian on the opposing vehicle lane side can be visually confirmed sufficiently, the driver can prohibit lighting of the zone C intentionally to attempt an effective utilization of electric power.

In the above-described case, when the zone B is lighted, the lighting is maintained because lighting of the zone B does not give glare on the opposing vehicle.

When it is judged that the high beam is turned on at Step 1, the flows jumps to Step 12 and the right side auxiliary lamp 5 is turned on to light the zone B, then at Step 13, the high beam display lamp 20 is turned on.

Thereafter, the flow jumps to Step 10 from Step 13 to turn on the left side auxiliary lamp 4 for lighting the zone C and then the zone C lighting display lamp 21 is turned on (Step 11).

Namely, when the high beam is turned on, both the zone B and the zone C are lighted.

When the opposing vehicle sensor 7 detects an opposing vehicle during running with the high beam turned on, the high beam may be changed to the low beam. In this case, the auxiliary lamp 4 is turned off simultaneously.

Figure 7:
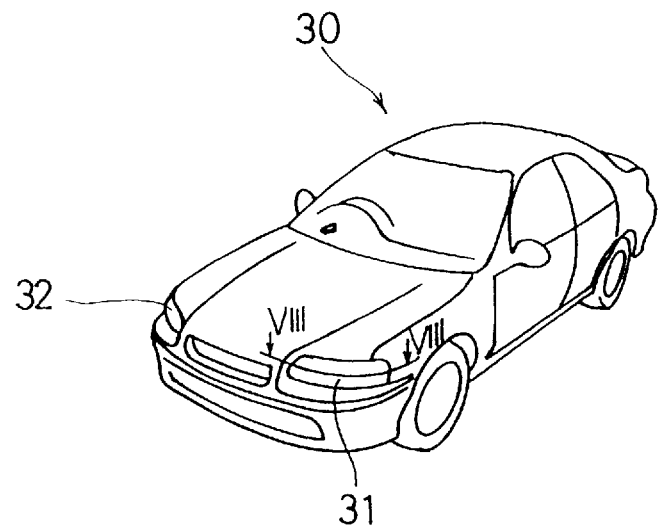
FIG. 7 is a perspective view of a motorcar according to another preferred embodiment.

In the above-mentioned preferred embodiment, the auxiliary lamps 4, 5 are separated from the head lights 2, 3. However, the auxiliary lamps may be arranged within the head light as shown in FIGS. 7 and 8 according to the second preferred embodiment of the invention.

The right and left head lights 32, 31 of the motorcar 30 have two bulbs therein, respectively.

Figure 8:
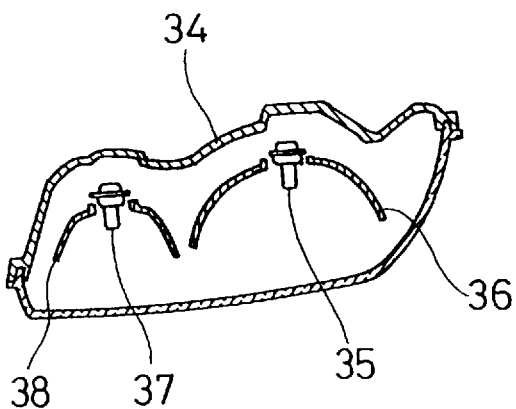
FIG. 8 is a sectional view taken along the line VIII—VIII of FIG. 7.

FIG. 8 is a sectional view of the left side head light 31. Within a sole head light housing 34 are arranged, in right and left, a main bulb 35 with double filaments and its reflector 36 as main light emitting means an auxiliary bulb 37 with a single filament and its reflector 38 as an auxiliary lamp.

The right side head light 32 has a construction symmetrical to that of the left side head lamp 31 with the auxiliary lamp arranged inside.

The double filaments of the main bulb 35 are used for being changed over from each other for the high beam and the low beam which lights the zone A in FIG. 2.

An auxiliary bulb 37 of single filament arranged in a right side head light housing 34 lights the zone B and the auxiliary bulb 37 of single filament arranged in the left side head light housing 34 lights the zone C.

Figure 6:
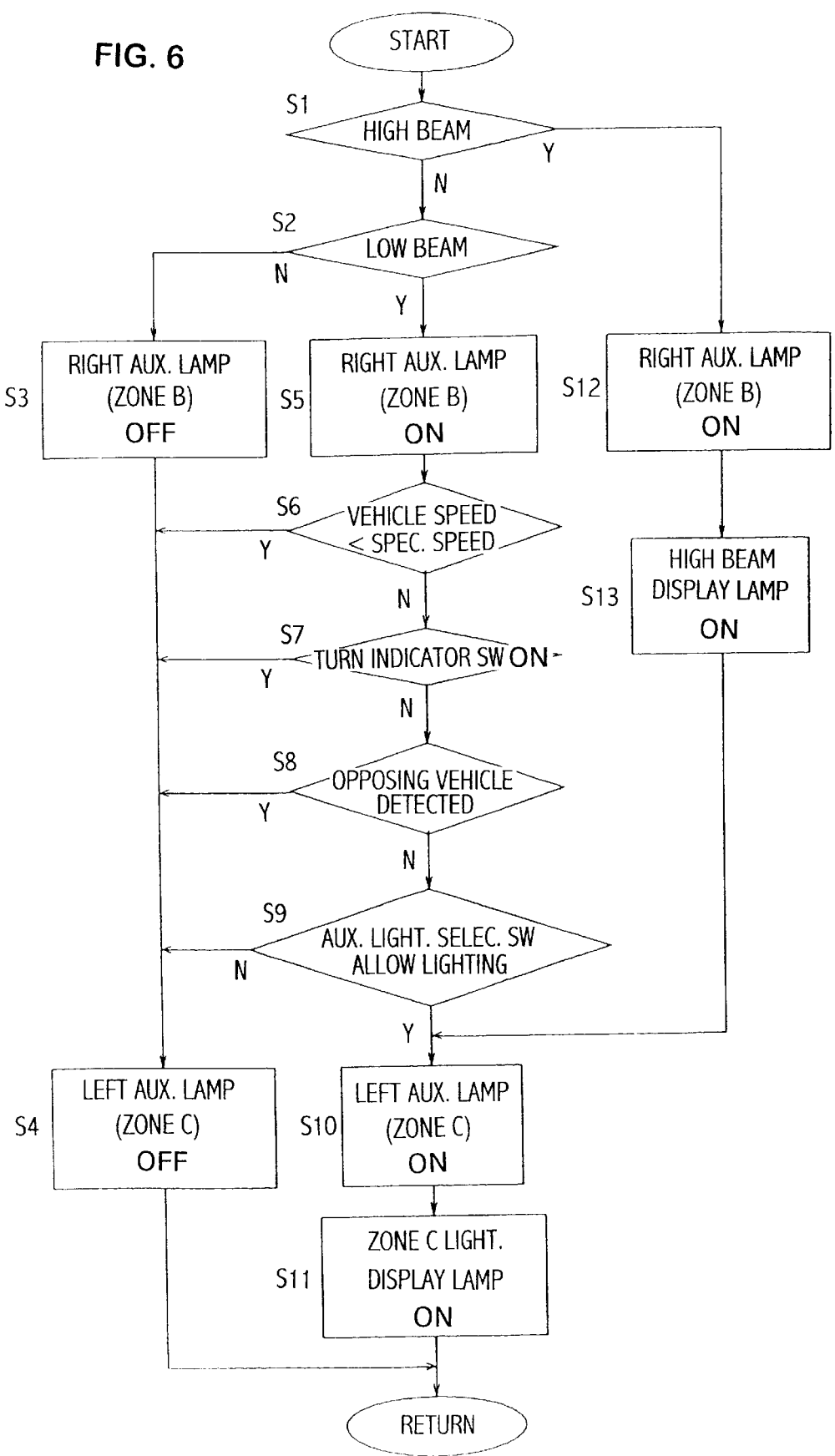
FIG. 6 is a flow chart showing a control procedure in the control system.

Thus, the present embodiment is different from the aforementioned first embodiment only in the point that the auxiliary bulb 37 and its reflector 38 as the auxiliary lamp is arranged within the head light housing 34 together with the main bulb 35, and control of turning on of the right and left auxiliary bulbs 37 is similarly carried out according to the flow chart of FIG. 6.

Next, a third preferred embodiment will be described with reference to FIGS. 9 and 11.

Figure 9:
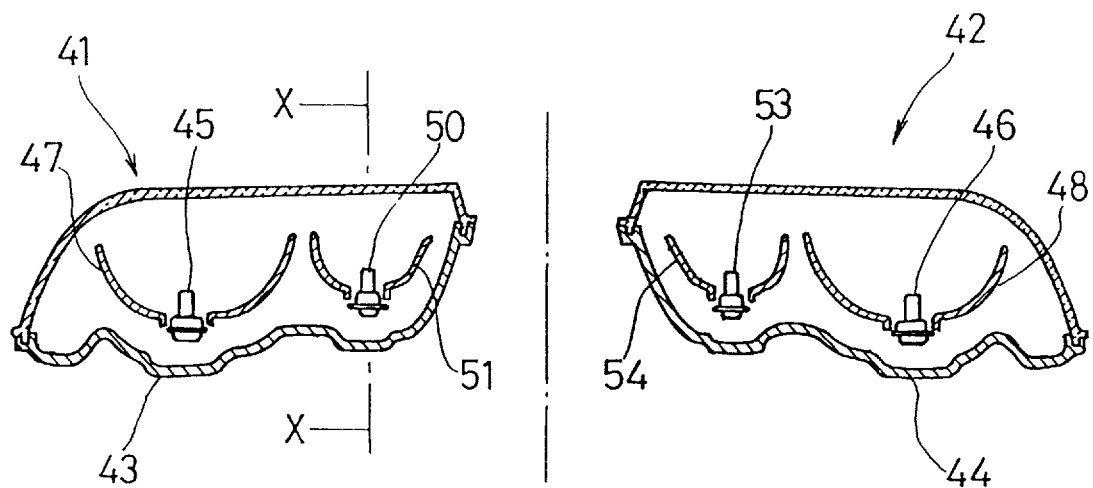
FIG. 9 is a sectional view of both head lamps in a third preferred embodiment.

FIG. 9 is a sectional view of right and left head lights 42, 41 according to the third preferred embodiment. Head light housings 43, 44 are symmetrical and have two bulbs within, respectively.

Figure 10:
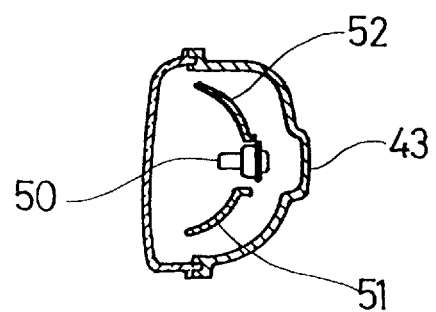
FIG. 10 is a sectional view taken along the line X—X of FIG. 9.

Bulbs 45, 46 at the outer sides are of single filament construction for the low beam and light the zone A in FIG. 2 together with reflectors 47, 48. A bulb 50 on the inner side in the left side head light 41 is of double filaments construction, having, as shown in FIG. 10, a filament forming the high beam in cooperation with an under side reflector 51 and a filament lighting the zone C as the left side auxiliary lamp in cooperation with an upper side reflector 52, incorporated within the same bulb.

A bulb 53 on the inner side in the right side head light 42 is also of double filaments construction, having, similarly to the left side bulb 50, a filament forming the high beam in cooperation with an under side reflector and a filament acting as the right side auxiliary lamp in cooperation with an upper reflector (not shown), incorporated within the same bulb.

The filament acting as the right side auxiliary lamp lights the zone B otherwise than the above-mentioned left side auxiliary lamp.

In the head lights 41, 42, the high beam and the auxiliary lamp are operated selectively and never turned on simultaneously. In this point, this embodiment is distinct from the aforementioned first and second embodiments.

A control procedure by a control system according to this embodiment will be described with reference to a flow chart of FIG. 11.

The control system of this embodiment is about the same as that of the aforementioned first embodiment shown by the block diagram of FIG. 5, but in this embodiment, a signal from a steering angle sensor is inputted for control.

Figure 11:
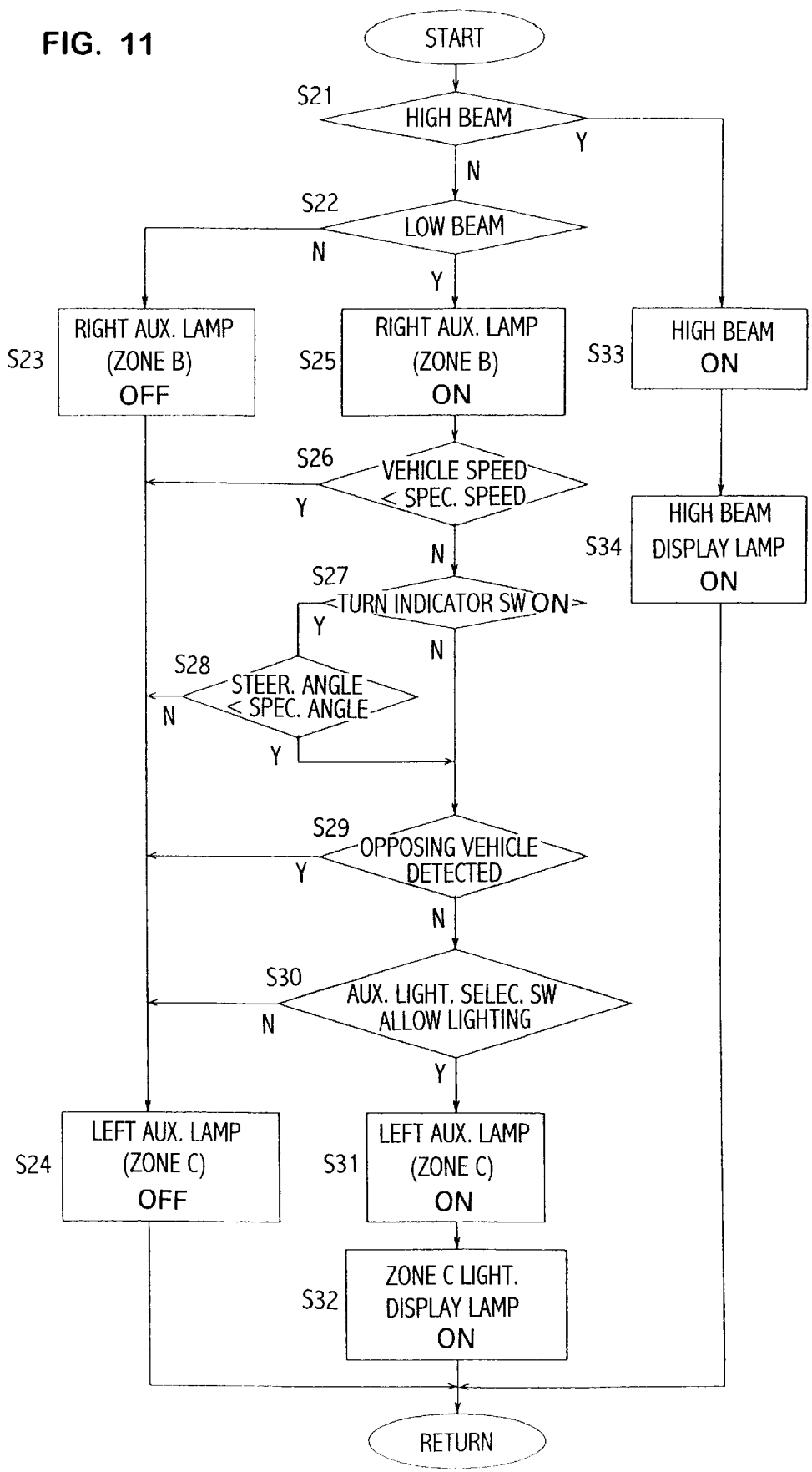
FIG. 11 is a flow chart showing a control procedure of a control system in the third embodiment.

In the flow chart of FIG. 11, steps 21, 22, 23, 24 are the same as steps 1, 2, 3, 4 of FIG. 6, and when both the high beam and the low beam are not turned on, the right and left auxiliary lamps are turned off and lightings of the zones B, C are not carried out.

When the low beam is turned on, the left and right single filament bulbs 45, 46 are turned on to light the zone A, and in such a state the flow advances from Step 22 to Step 25 where the right side auxiliary lamp is turned on to light the zone B. If conditions that the vehicle speed is not low (Step 26), the turn indicator switch 19 is not turned on (Step 27), there is no opposing vehicle (Step 29), and the auxiliary light emitting selection switch 18 is turned on (Step 30) are satisfied, the left side auxiliary lamp is turned on to light the zone C (Step 31) so as that the pedestrian on the opposing vehicle lane side can be easily, visually detected, and the zone C lighting display lamp is turned on (Step 32).

When an opposing vehicle is detected at Step 29, or it is discriminated that the vehicle speed is low at Step 26, or the auxiliary light emitting selection switch is turned off at Step 30, the flow jumps to Step 24 to stop lighting of the zone C so as not to give glare on the opposing vehicle.

When the turn indicator switch is turned on at Step 27, the flow advances to Step 28 and whether the steering angle is smaller than a specific angle or not is discriminated. If the steering angle is smaller, it is supposed that the vehicle is changing its running direction actually and the flow advances to Step 24 to stop unnecessary lighting of the zone C.

When the high beam is turned on, the flow jumps from Step 21 through Step 33 to Step 34, and the high beam display lamp is turned on for facilitating the driver's confirmation. The left and right double filament bulbs 50, 53 are turned on to emit the high beam.

In this embodiment, it is impossible to turn on the auxiliary lamp simultaneously with the high beam. Accordingly, the flow does not advance to Step 31 from Step 34 as in case of the aforementioned embodiment, but returns to Step 21 from Step 34.

According to the above-mentioned preferred embodiments, when an opposing vehicle is detected for example, the auxiliary lamp is turned off to stop lighting the zone C. However, the auxiliary lamp may be adjusted to reduce the light to an extent that glare is not given on the opposing vehicle.

According to the present invention, since the auxiliary light emitting means lights the front and upper portion on the opposing vehicle lane side, the pedestrian on the opposing vehicle lane side can be easily perceived when the auxiliary light emitting means is turned on. When the opposing vehicle detection means detects the opposing vehicle, the control means decreases or turns off the light of the auxiliary light emitting means so as not to give glare on the opposing vehicle.

Since turning on of the auxiliary light emitting means is prohibited when the auxiliary light emitting selection switch is turned off, the driver can prohibit the turning on of the auxiliary light emitting means by manipulating the auxiliary light emitting selection means when he perceives that the turning on of the auxiliary light emitting means is unnecessary, and permit turning of on the auxiliary light emitting means only when necessary to avoid useless consumption of electric power.

Since turning on of the auxiliary light emitting means is prohibited when the vehicle speed sensor detects a low speed below a specific speed, it is possible to avoid unnecessary turning on of the auxiliary light emitting means under slow running at the low speed and uselessly giving glare on the opposing vehicle.

The auxiliary light emitting means does not always illuminate a pedestrian when the vehicle changes its running direction. Therefore, when the turn indicator switch is manipulated on, the turning on of the auxiliary light emitting means is prohibited to reduce glare given to the opposing vehicle as much as possible Since the turning on of the vehicle light emitting means is prohibited when the turn indicator switch is manipulated on and the steering angle sensor detects a steering angle larger than a specific angle, even if the turn indicator switch is manipulated on, the auxiliary light emitting means does not turn off until the specific steering angle is reached. That it, it does not turn off at mere change of lane for example, and the turning on of the auxiliary light emitting means can be prohibited only when the steering angle becomes larger than the specific angle to change the running direction.

Since the opposing vehicle detection means detects the opposing vehicle by detecting an emitted light from a head lamp of the opposing vehicle, it is possible to detect the opposing vehicle surely for controlling the turning on of the auxiliary light emitting means.

Although there has been presented above a detailed description of the presently preferred embodiments of the invention, it will be understood by those skilled in the art that various changes and modifications may be made thereto without departing from the spirit or essence of the invention. The scope of the invention is indicated by the appended claims rather than by the foregoing description.

What is claimed:

1. A head lamp device for a subject vehicle, comprising:
   main light emitting means capable of changing over a low beam and a high beam from each other;
   auxiliary light emitting means for lighting a front and upper portion on an opposing vehicle lane side concurrently while said main light emitting means emits one of said low beam and said high beam;
   opposing vehicle detection means for detecting existence of an opposing vehicle; and
   control means for controlling said auxiliary light emitting means, said control means decreases or turns off the light of auxiliary light emitting means in response to input of an opposing vehicle detection signal from said opposing vehicle detection means when said main light emitting means emits said low beam at the same time said auxiliary light emitting means is turned on.

2. A head lamp device for a vehicle as claimed in claim 1, further comprising an auxiliary, manipulatable light emitting selection switch for selecting whether turning on of said auxiliary light emitting means is appropriate or not, and said control means prohibits the turning on of said auxiliary light emitting means when the main light emitting means emits the passing-by beam and said auxiliary light emitting selection switch is manipulated to a not-appropriate position thereof.

3. A head lamp device for a vehicle as claimed in claim 2, further comprising a vehicle speed sensor for detecting speed of the subject vehicle, a turn indicator switch, and a steering angle sensor, and said control means prohibits the turning on of said auxiliary light emitting means when said main light emitting means emits the low beam and at least one of the following conditions exists:

the vehicle speed sensor detects a low speed of the subject vehicle below a specific speed;

the turn indicator switch is manipulated on; and the steering angle sensor detects a steering angle larger than a specific angle.

4. A head lamp device for a vehicle as claimed in claim 1, further comprising a vehicle speed sensor for sensing speed of the subject vehicle, and said control means prohibits the turning on of said auxiliary light emitting means when said main light emitting means emits the low beam and said vehicle speed sensor detects a low speed of the subject vehicle below a specific speed.

5. A head lamp device for a vehicle as claimed in claim 1, wherein said control means prohibits the turning on of said auxiliary light emitting means when said main light emitting means emits the low beam and a turn indicator switch is manipulated on.

6. A head lamp device for a vehicle as claimed in claim 1, further comprising a steering angle sensor, and said control means prohibits the turning on of said auxiliary light emitting means when said main light emitting means emits the low beam, a turn indicator switch is manipulated on and said steering angle sensor detects a steering angle larger than a specific angle.

7. A head lamp device for a vehicle as claimed in claim 1, wherein said opposing vehicle detection means detects the opposing vehicle by detecting an emitted light from a head lamp of the opposing vehicle.

8. A head lamp device for a vehicle as claimed in claim 1, wherein said auxiliary light emitting means further lights a front and intermediate portion on the opposing vehicle lane side, and said control means controls lighting of the front and upper portion on the opposing vehicle lane side separately from lighting of the front and intermediate portion on the opposing vehicle lane side.

9. A head lamp device for a vehicle as claimed in claim 8, wherein said control means controls said auxiliary light emitting means such that said front and intermediate portion on the opposing vehicle lane side is lighted when the front and upper portion on the opposing vehicle lane side is not lighted.

10. A head lamp device for a vehicle according to claim 1, further comprising display means for providing an indication to a driver when the auxiliary light emitting means is turned on.

11. A head lamp device for a vehicle according to claim 1, wherein said auxiliary light emitting means and said main lighting means are provided together in a single head lamp unit.

12. A head lamp device for a vehicle according to claim 11, wherein said auxiliary lighting emitting means and said main lighting emitting means jointly include a single light bulb for emitting said high beam and said auxiliary light.

13. A head lamp device for a vehicle according to claim 1, wherein said auxiliary lighting emitting means and said main lighting emitting means are provided in separate lamp units.

* * * * *

UNITED STATES PATENT AND TRADEMARK OFFICE
CERTIFICATE OF CORRECTION

PATENT NO : 5,854,537
DATED : Dec. 29, 1998
INVENTOR(S): Shinchiro Gotoh, Takeshi Kobayashi, Shujiro Ohnuma, Tatsuya Ishizaki It is certified that error appears in the above-identified patent and that said Letters Patent is hereby corrected as shown below:

Column 1, line numbered between 42 and 43, change "omitting" to
--emitting--.
Column 2, line 7, change "mean" to --means--.
Column 7, line 65, change "of on" to --on of--.
Column 8, 18th line, change "That it," to --That is,--;
    line 54, change "selecting whether turning on" to
--enabling and disabling activation--;
    line 55, delete "is appropriate or not";
    line 57, change "the main" to --said main--;
    line 58, change "passing-by" to --low--;
    lines 59-60, change "is manipulated to a not-appropriate
position thereof" to --turned off--.

Signed and Sealed this

Fifth Day of October, 1999

Q. TODD DICKINSON

*Attest:*

*Attesting Officer*       Acting Commissioner of Patents and Trademarks